United States Patent

Clark

[15] 3,651,251

[45] Mar. 21, 1972

[54] FACSIMILE SIGNAL MODIFICATION REDUCING THE INFORMATION CHANNEL BAND-WIDTH

[72] Inventor: John H. Clark, Northport, N.Y.

[73] Assignee: International Scanatron Systems Corp., Wyandanch, N.Y.

[22] Filed: May 1, 1970

[21] Appl. No.: 33,652

[52] U.S. Cl. ............................................178/6, 178/DIG. 3

[51] Int. Cl. ........................................H04n 7/10, H04h 7/12

[58] Field of Search ..........................178/6, DIG. 3, 6.8, 7.1; 325/38 A

[56] References Cited

UNITED STATES PATENTS 3,233,236 2/1966 Katzenstein et al..................325/38 A

*Primary Examiner*—Robert L. Griffin
*Assistant Examiner*—Barry Leibowitz
*Attorney*—Alfred W. Barber

[57] ABSTRACT

Shortening the marking pulses (non-background) by an amount equal to the shortest pulse which the system is intended to pass improves the performance of the three level, band-width reducing system described in the application entitled "Facsimile Signal Modification Reducing the Information Channel Band-Width" filed on Dec. 21, 1967 and bearing Ser. No. 701,511 now U.S. Pat. No. 3,588,330.

As pointed out in the above referred to patent the three level signal generated in accordance with the disclosure is asymmetric with the background being represented by the outside pair of levels and the line information as the center level. This mode of operation results in a system wherein the band-width required for background-to-background transitions is halved. In such a system, however, closely spaced black to white transitions in series approach the symmetrical alternating condition and therefore are passed with varying efficiency. For transitions representing small segments of background in a field of markings, no band-width compression occurs. This causes a deficiency in the actual copy.

Another characteristic of the original system described in the above referred to application is that modulation depth varies as the keying speed is increased above a certain point. Note that for a symmetrical three level wave the channel band-width restriction filters process a three level signal at the limit of resolution to a sine wave having a peak-to-peak value of one-half the value of the original wave.

6 Claims, 3 Drawing Figures

INVENTOR.
JOHN H. CLARK

BY Alfred W. Barber
ATTORNEY

*INVENTOR.*

*BY* Alfred W. Barber

ATTORNEY

FACSIMILE SIGNAL MODIFICATION REDUCING THE INFORMATION CHANNEL BAND-WIDTH

SUMMARY

The solution to both problems has been found to be to shorten all marking pulses (non-background) by an amount substantially equal to the shortest pulse which the system is intended to pass. It has been found that when this is done the effective resolution of the overall system (pickup scanner through reproducing recorder) is maintained at full efficiency up to the maximum resolution of the system. Signals representing copy detail too fine to be transmitted are eliminated thereby providing a cleaner more readily processed signal.

The newly modified system operates basically as set forth in the above referred to patent. The improvement is provided in accordance with the preferred form of the invention by adding a controlled rise-time circuit which effectively reduces the marking pulses by a predetermined amount (for example, by an amount substantially equal to the time or width of the shortest marking pulse which is desired to transmit and reproduce) and an additional (second) Schmitt trigger which squares the shortened marking pulses. The result is that the three level signal provided after performing this shortening exhibits a shortened dwell at the mid-level of the signal. At the limit of resolution, the mid-level dwell substantially disappears and the received signal at the reproducing end becomes a full amplitude sine wave which, when processed by the receiving and reproducing circuits (as described in the above referred to patent), provides a full amplitude marking signal representing the finest detail of which the overall system is capable of processing from input to output. In addition, a fine line background signal is increased in width so that it passes through the system at substantially half frequency and full amplitude.

Figure 1:
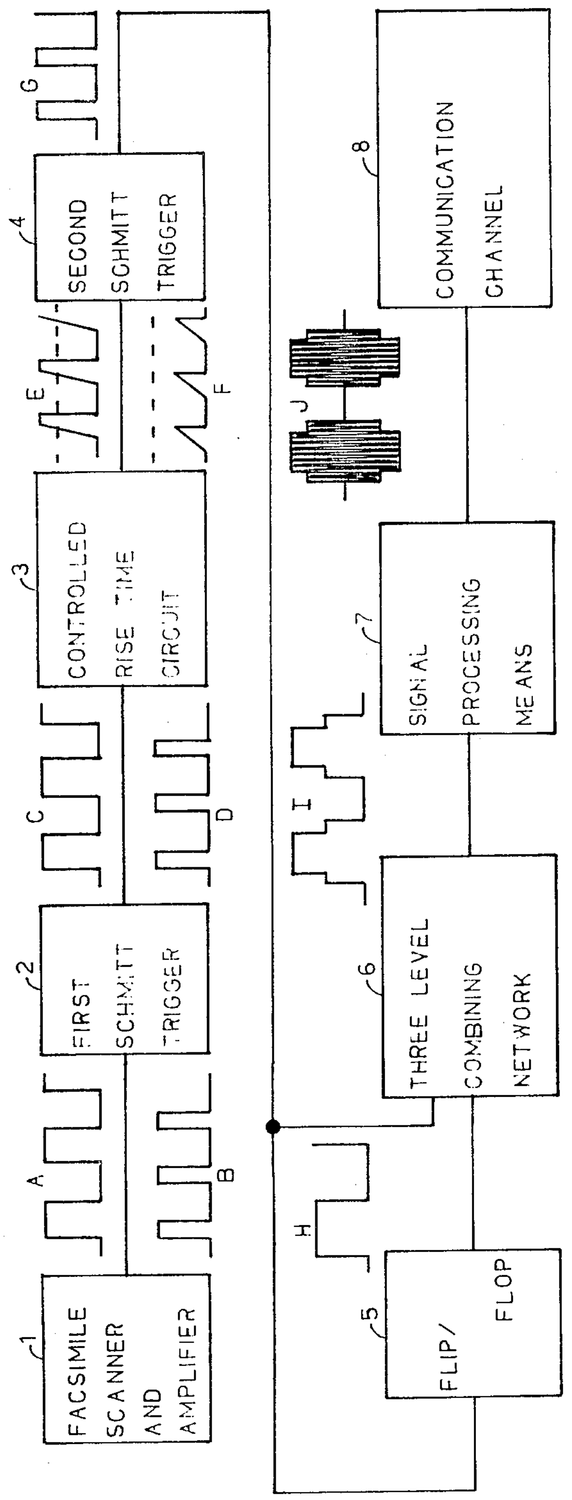
FIG. 1 is a block diagram of a facsimile transmitter in accordance with the invention.

FIG. 1 shows a facsimile scanner and amplifier 1 which may be taken to include a scanner and all electrical circuits required to provide pulses in accordance with the copy being scanned as illustrated by the curves A and B. The signals A may be taken to represent copy detail (marking signals) approaching the limit of resolution of the overall system while signals B may be taken to represent finer detail signals which cannot be passed by the overall system and hence are to be eliminated (see below). The facsimile signals, such as A and B, are fed to first Schmitt trigger 2 where they are aquared up and rendered of uniform amplitude as shown by signals C and D. The output of the first Schmitt trigger is fed to controlled rise time circuit 3 (a suitable circuit is shown in detail in FIG. 2) which cuts the duration of the signals due to the controlled rise time which produces a leading edge slope as shown at E and F. The controlled rise time signals (as E and F) are applied to second Schmitt trigger 4 which is set to trigger at the dotted lines on E and F. The resulting output from Schmitt trigger 4 due to the E signals will be the shortened pulses G while the F signals not reaching the trigger level (dotted line) will produce no output and hence are eliminated from the balance of the system. The output from Schmitt trigger 4 (signals G) are applied to flip-flop 5 and to the three level combining network 6 (see the above referenced patent for details). Since flip-flop 5 provides an output pulse which changes level at each leading edge of signal G, its output will be a half frequency pulse H. The output of flip-flop 5 is also applied to three level combining network 6 and the output thereof will be as shown by curve I. Curve I can be described as a signal of half frequency having a shortened marking signal portion (the dwell time at the center of the signal I) and elongated positive and negative going (background) signals. For transmission of the new signal over communication channel 8, the signal may be processed by signal processing means 7 as by impressing signal I on a carrier providing an amplitude modulated signal J suitable for transmission to a receiving point over communication channel 8.

At the receiving end the new signal is processed in the same manner as set forth in the above referred to patent. It has been found that copy detail near the limit of resolution of the overall system is substantially enhanced while detail too fine to be processed is eliminated (at the input to second Schmitt trigger 4) and hence does not interfere with the processing and reproduction of fine detail which can be handled. Also fine line background signals are enhanced (see FIG. 3).

Figure 2:
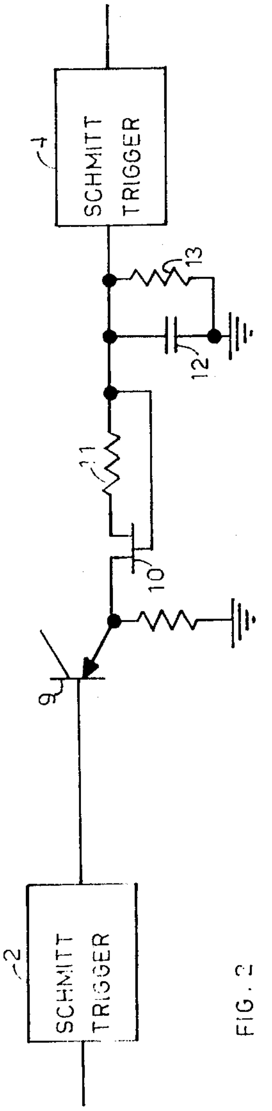
FIG. 2 is a circuit which provides pulse shortening in accordance with the invention.

FIG. 2 is one form of controlled rise time circuit (block 3 in FIG. 1) which may be used in carrying out the objects of the invention. This controlled rise time circuit is connected between first Schmitt trigger 2 and second Schmitt trigger 4 and includes a coupling or driver transistor 9 emitter coupled to a constant current circuit consisting of field effect transistor 10 and current determining resistor 11 charging capacitor 12. Thus, when a pulse appears at the output of Schmitt trigger 2 and applied to the base of transistor 9, the voltage at the input to the second Schmitt trigger 4 does not reach full amplitude instantaneously but rises at a rate determined by the constant current circuit as it charges capacitor 12 (see E and F in FIG. 1). Resistor 13 may be connected across capacitor 12 to swamp the input resistance of the Schmitt trigger 4 so that the charging time will be independent of the Schmitt trigger input resistance. At the instant at which the marking drops to zero, capacitor 12 rapidly discharges back through field effect transistor 10 and the emitter resistor of transistor 9 preserving the trailing edge characteristics of the marking signal.

Figure 3:
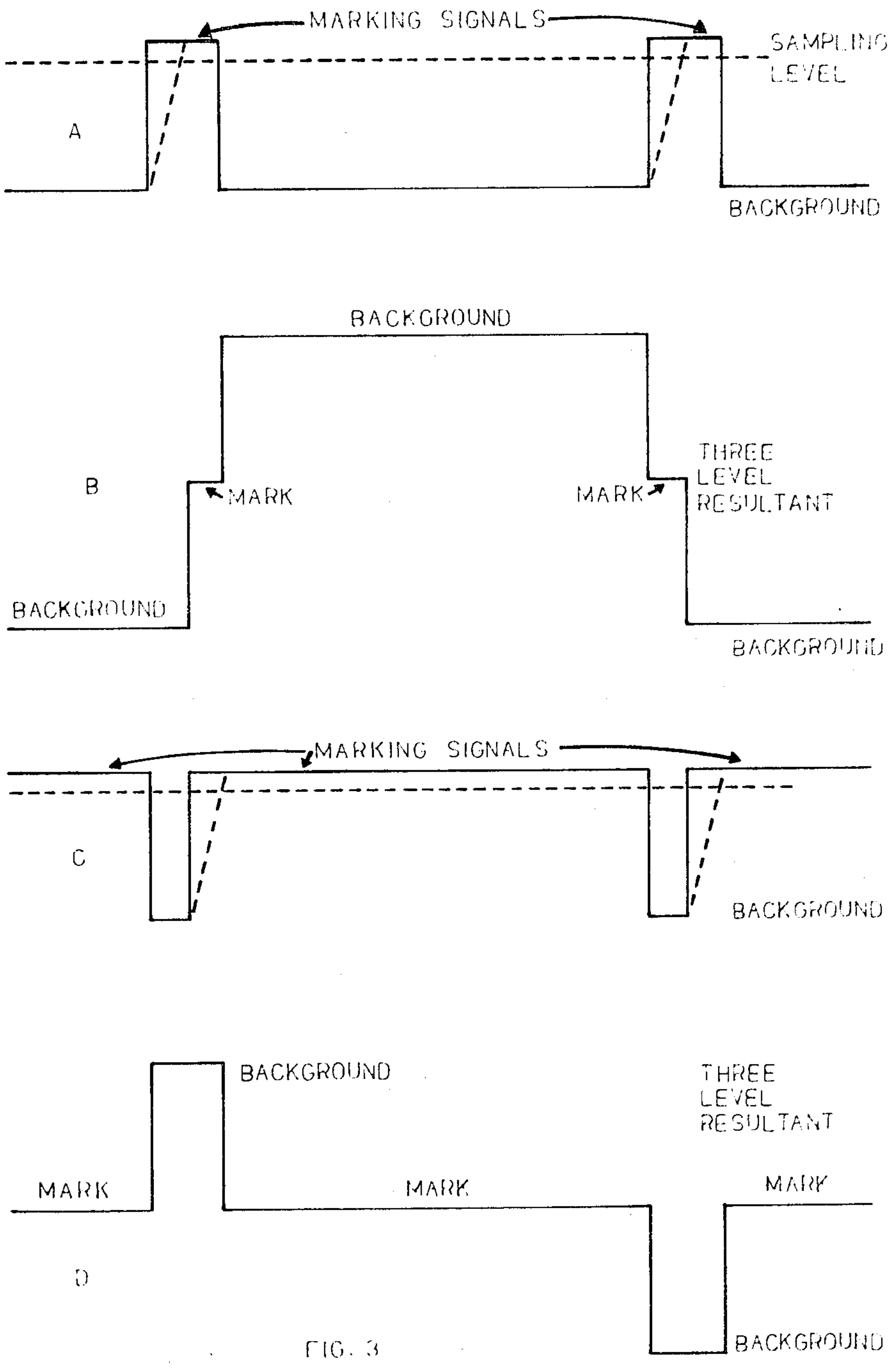
FIG. 3 is a set of graphical representations illustrating the operation of the present invention for both marking and background signals approaching the limit of resolution of the system.

FIG. 3 illustrates how the present invention operates on fine detail marking signals and on fine detail background signals. Graph A shows how a narrow marking signal is reduced in width by the controlled rise time circuit resulting in reducing the effective width (at the sampling level) of the signal. Graph B shows the resulting reduced mid-level dwell of the marking signal at mid-level in the resultant three level signal. It is this resultant three level signal which is processed and transmitted over the communications channel. At the other extreme graph C illustrates how a very narrow background signal is processed. The controlled rise time circuit (as shown by the dotted line) reduces the duration of the marking signals which accordingly increases the duration of the background signal at the sampling level (horizontal dotted line). The resulting three level signal shown in graph D provides longer duration background signals. Since the fine line background signals have been increased in duration, their effective frequency has been reduced so that they are maintained at full amplitude through the balance of the system and are fully reproduced at the receiving end of the system.

I claim:

1. In a facsimile signal system wherein the facsimile copy comprises copy to be transmitted and a contrasting background, said copy occupying a relatively small portion of the background and when scanned providing a signal of substantial dissymmetry with respect to background level, the combination of;

facsimile copy scanning means for providing signal pulses in accordance with scanned copy and background material;

first Schmitt trigger means coupled to said scanning means for providing substantially constant amplitude pulses in synchronism with said signal pulses;

means for controlling the rise time of said constant amplitude pulses coupled to said first Schmitt trigger means;

second Schmitt trigger means coupled to said means for controlling the rise time for providing substantially constant amplitude second pulses shorter than said first pulses by a predetermined time interval in accordance with said controlled rise time;

flip-flop means coupled to said second Schmitt trigger for providing substantially constant amplitude pulses of substantially twice the amplitude of said second pulses and of half the repetition rate thereof and triggered thereby;

means for gating said double amplitude pulses off during any on period of the said second pulses;

means for combining the said second pulses and said gated flip-flop pulses to provide a three level signal;

and means for utilizing said three level signal for transmitting information representing said facsimile copy whereby said three level signal exhibits a maximum level, a minimum level and an intermediate level and said intermediate level is in accordance with said mark responsive second pulses.

2. In a facsimile signal system for providing electrical signals representing copy to be transmitted against a contrasting background, wherein said copy occupies a relatively small area when compared with said background area and wherein said copy comprises a substantial amount of fine line detail to be transmitted, and said signals are unsymmetrical to a substantial degree as a result of said copy and background relative areas, the combination of;

facsimile scanner means for providing first signal pulses of substantially constant amplitude rising from a substantially constant reference level in response to black copy on a white background;

means for reducing the width of said first signal pulses by a predetermined amount;

means for providing second signal pulses in accordance with said reduced width pulses;

means for converting said second signal pulses and reference level to a three level signal one of the outer of said levels being substantially zero wherein said second signal pulses provide the mid-level portions and said reference level is converted alternately to the remaining two levels contiguous with said mid-level portions;

and means for utilizing said three level signal.

3. In a facsimile signal system for providing electrical signals representing copy to be transmitted against a contrasting background, wherein said copy occupies a relatively small area when compared with said background area and wherein said copy comprises a substantial amount of fine line detail to be transmitted, and said signals are unsymmetrical to a substantial degree as a result of said copy and background relative areas, the combination of;

facsimile scanner means for providing first signal pulses of substantially constant amplitude rising from a substantially constant reference level in response to white copy on a black background;

means for reducing the width of said first signal pulses by a predetermined amount;

means for providing second signal pulses in accordance with said reduced width pulses;

means for converting said second signal pulses and reference level to a three level signal one of the outer of said levels being substantially zero wherein said second signal pulses provide the mid-level portions and said reference level is converted alternately to the remaining two levels contiguous with said mid-level portions;

and means for utilizing said three level signal.

4. In a facsimile signal system for providing electrical signals representing copy to be transmitted against a contrasting background, wherein said copy occupies a relatively small area when compared with said background area and wherein said copy comprises a substantial amount of fine line detail to be transmitted, and said signals are unsymmetrical to a substantial degree as a result of said copy and background relative areas, the combination of;

facsimile scanner means for providing first signal pulses of substantially constant amplitude rising from a substantially constant reference level in response to copy to be reproduced against a contrasting background, wherein said reference level is in accordance with said background;

means for reducing the width of said first pulses by a predetermined amount;

means for providing second signal pulses in accordance with said reduced width pulses;

means for converting said second signal pulses and reference level to a three level signal one of the outer of said levels being substantially zero wherein said second signal pulses provide the mid-level portions and said reference level is converted alternately to the remaining two levels contiguous with said mid-level portions;

and means for utilizing said three level signal.

5. In an information transmission system, the combination of;

a source of information bearing first pulses of predetermined amplitude level rising from a base level constituting a first and reference level, wherein said first pulses represent a second level;

means for reducing the width of said first pulses by a predetermined amount;

means for providing second signal pulses in accordance with said reduced width pulses;

means for converting said first level signals and said second pulses to a three level signal wherein said second pulses are converted to substantially the mid-level of said three level signal and wherein said base level is converted to one of the two remaining levels immediately preceding said pulse responsive mid-level and to the last remaining level immediately following said mid-level signal;

wherein the level falling below said mid-level is substantially zero level;

and means for using said three level signal in a communications system for the transmission of information contained in said pulses.

6. An information transmission system as set forth in claim 5 wherein said reference level is substantially zero.

* * * * *